May 21, 1963     H. P. SCHRANK     3,090,416

TUBELESS TIRE WITH PUNCTURE SEALING DEVICE

Filed Feb. 12, 1958

INVENTOR.
HARRY P. SCHRANK
BY
William Cleland
ATTORNEY

United States Patent Office 3,090,416
Patented May 21, 1963

3,090,416
TUBELESS TIRE WITH PUNCTURE SEALING DEVICE
Harry P. Schrank, 120 Twin Oaks Road, Akron 13, Ohio
Filed Feb. 12, 1958, Ser. No. 714,755
4 Claims. (Cl. 152—347)

This invention relates to tubeless pneumatic tires.

In the past tubeless pneumatic tires have had a thin liner of air-impervious elastic material, such as butyl-type rubber, integrally vulcanized on the inside of the tire casing. The purpose of this liner was to prevent diffusion of inflation air outwardly through the relatively porous rubber of the tire casing. It has been found, however, that at best such air-impervious materials, including butyl rubber, were not completely effective to prevent loss of inflation air from tire casings when the same were punctured by sharp objects. It also has been observed that although such liners were cured to the tire casings by vulcanization under internal pressure, they were not without some degree of inherent tension, particularly when the tires were under inflation. Moreover, it is known that as a rolling tire is depressed at the road contact area, there is a tendency toward stretching said inner liner, because the fulcrum or flexing point of the tire is intermediate the inner and outer surfaces of the crown of the tire. As a result, the liner is not relaxed at all times. Accordingly, a puncturing object if withdrawn from such a tire was likely to leave a hole in the liner through which inflation air could leak.

One object of the present invention is to provide an improved tubeless pneumatic tire having, in addition to an integral air-impervious liner of the type described, a simple, economical, auxiliary device which is self-operating effectively to grip a puncturing object extending therethrough in air-sealing manner, or to close a hole made by the object after its withdrawal.

Another object of the invention is to provide a puncture-sealing device of the character described, which lends itself to easy repair of a puncture extending through the crown of the tire, including the liner, and also provides an easy way to balance the tire by use of tube repair patches or pieces of gum rubber.

Other objects of the invention will be manifest from the following brief description and the accompanying drawings.

Figure 1:
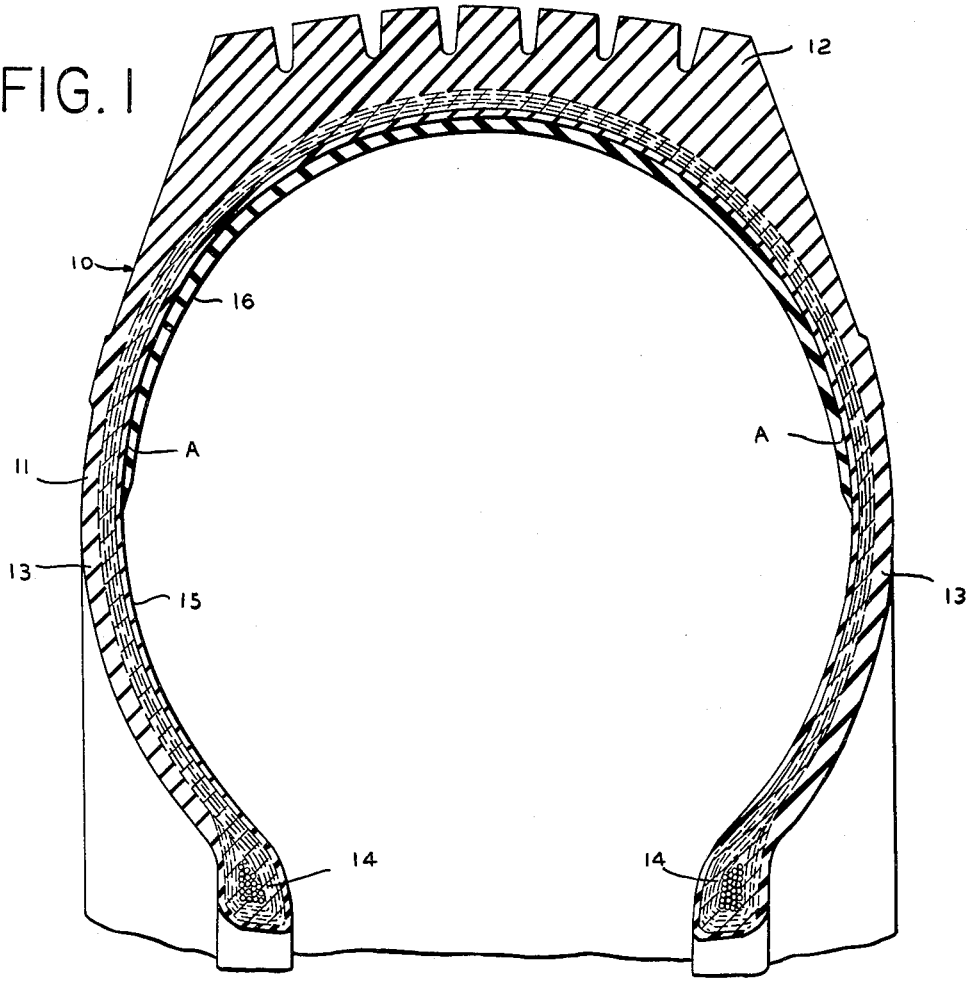
FIGURE 1 is a cross-section of a tubeless tire having the puncture sealing device of the invention incorporated therein.

Referring to FIGURE 1 of the drawing, there is illustrated a tubeless pneumatic tire 10 of known general type, including a casing 11 of rubber and reinforcing rubberized fabric, said casing having the usual crown portion 12 and opposite sidewalls 13, 13 terminating in wire reinforced beads 14, 14 which are adapted to be received in air-sealing relation in an annular seat of a drop center type rim (not shown). For the purpose of minimizing outward diffusion of inflation air through the tire casing 11, the same may have vulcanized to the inner surface portions thereof a thin liner 15 of air-impervious elastic material, such as butyl-type rubber, said liner extending from bead to bead of the tire, as shown.

Attached to the liner 15 at laterally opposite peripheral portions of the sidewalls 13, as indicated at points A, A, may be a thin, annular membrane 16 of air-impervious rubber, such as butyl-type rubber, said membrane being vulcanized or otherwise mechanically and/or chemically formed to fit snugly completely around the crown portion of the tire, relatively loosely. In other words, the membrane not being subject to certain tensioning undergone by the liner 15, is normally smooth and without tension within the material of the same whether the tire in inflated or not. The marginal edges of the membrane 16 may be feathered into the liner 15 and vulcanized to the same after suitable treatment of the auxiliary liner to prevent adhesion of the same to the liner 15 between the points A, A.

In use of the tire, while inflated in known manner on a drop center rim (not shown), a puncturing object pierced through the crown portion 12 of the tire, the liner 15, and the auxiliary liner or membrane 16, may possibly result in a condition which could cause leakage of inflation fluid, such as air, through the liner 15. Because the membrane 16 is not under tension, however, it has an inherent tendency to close about the puncturing object to seal the hole made by same. If the membrane 16 should not be completely effective to prevent leakage of inflation air, it will, because it is relaxed, grip the puncturing object sufficiently to retard such leakage, so that a vehicle on which the tire is operated may be driven to a service station where a simple repair may be made. Thus, the usual necessity for providing spare tires on vehicles may be obviated or reduced.

The membrane 16, being completely relaxed at all times and not being attached to the tire in the crown area thereof, will not stretch with the tire casing as it flexes in service. Accordingly, the tendency for previously applied repair patches, or patches of tire balancing gum rubber, to crack or to become loose will be virtually eliminated.

Figure 2:
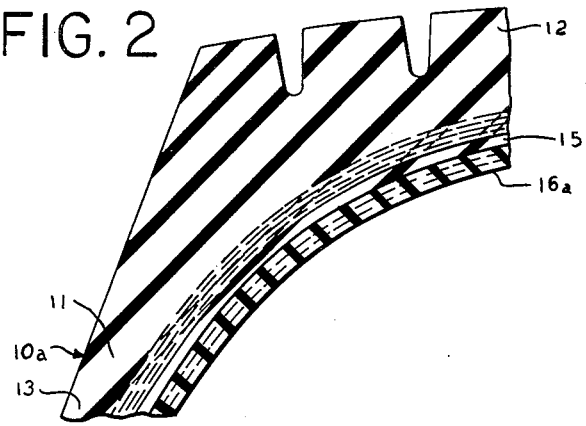
FIGURE 2 is an enlarged fragmentary cross-section of a tire embodying a modified form of the invention.

Referring to FIGURE 2 of the drawings, there is illustrated a tubeless pneumatic tire 10a which is in all respects like the tire 10 of FIGURE 1, except that the membrane 16a may be reinforced, as by means of textile cord plies, wire plies, or the like, angularly or otherwise suitably disposed, or a network of wire elements, to provide increased gripping power of the membrane 16 about the puncturing object. In place of or in addition to said reinforcing plies, the membrane 16a may have incorporated therein at least one ply of soft plastic material, such as unvulcanized or partially vulcanized rubber, adapted to enhance the puncture-sealing action of the membrane. The tire 10a otherwise functions in use substantially in the manner described in connection with FIGURE 1. Accordingly, like parts are indicated by like numerals, unless otherwise noted.

Other modifications of the invention may be resorted to without departing from the spirit thereof or the scope of the appended claims.

What is claimed is:

1. A tubeless pneumatic tire, comprising a rubber and fabric reinforced vulcanized casing having a tread portion and opposite sidewalls terminating in spaced annular beads, said casing having a liner of air-impervious vulcanizable elastic material integrally vulcanized to the inner surface portions thereof from bead to bead, and an annular member of relatively thin air-impervious vulcanizable elastic material integrally vulcanized to the shape of the inner surface of the casing and integrally bonded at marginal portions thereof to the opposite said sidewalls through said liner, peripherally around the same intermediate the tread portion and the respective said beads, said member between the marginal portions thereof being non-adhesive and unattached to the casing but fitting snugly against and conforming to the corresponding inner surface of said tread portion, the unattached portion of the member between said marginal portions normally being in smooth untensioned condition of the elastic material of the same, whereby a puncture made in the elastic member by an object pierced through the inflated casing will be sealed by the inherent tendency of the vulcanized elastic material of the member to resume said normal untensioned condition.

2. A tubeless pneumatic tire as set forth in claim 1, wherein said annular member has reinforcing means incorporated therein and anchored to said casing at said marginal portions, for increasing the resilient gripping action of the elastic material about said object.

3. A tubeless pneumatic tire as set forth in claim 1, wherein said annular member has incorporated therein at least one ply of reinforcing textile material for increasing the resilient gripping action of the elastic material about said object.

4. A tubeless pneumatic tire as set forth in claim 1, wherein said annular member has incorporated therein at least one ply of reinforcing metallic material for increasing the resilient gripping action of the elastic material about said object.

References Cited in the file of this patent

UNITED STATES PATENTS

| | | |
|---|---|---|
| 616,516 | Wilson | Dec. 27, 1898 |
| 2,237,245 | Wilson et al. | Apr. 1, 1941 |
| 2,244,941 | Degnon | June 10, 1941 |
| 2,698,042 | Perkins | Dec. 28, 1954 |
| 2,699,811 | Trautman | Jan. 18, 1955 |
| 2,839,118 | Gramelspacher | June 17, 1958 |